Figure 1:
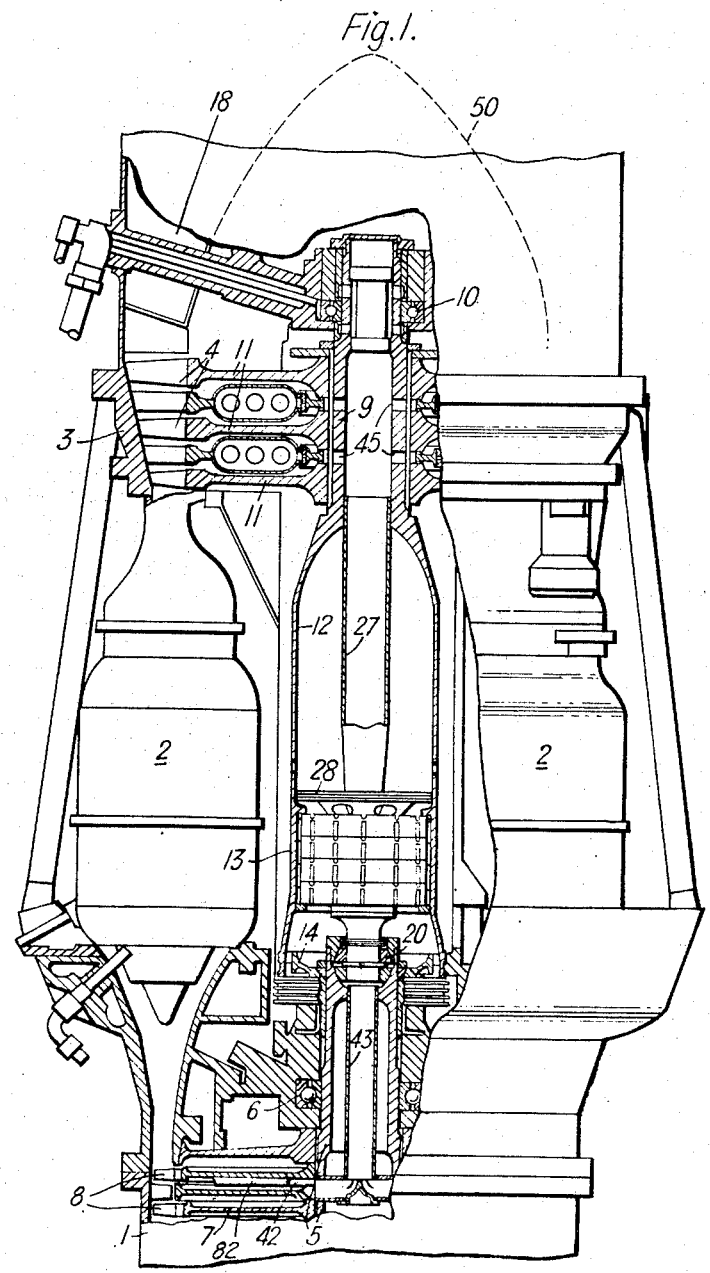

Sept. 23, 1958     M. J. FRENCH     2,852,917
THRUST BALANCED COMBUSTION TURBINE ENGINES
Filed April 18, 1955     4 Sheets-Sheet 1

Sept. 23, 1958        M. J. FRENCH        2,852,917
THRUST BALANCED COMBUSTION TURBINE ENGINES
Filed April 18, 1955                    4 Sheets-Sheet 2

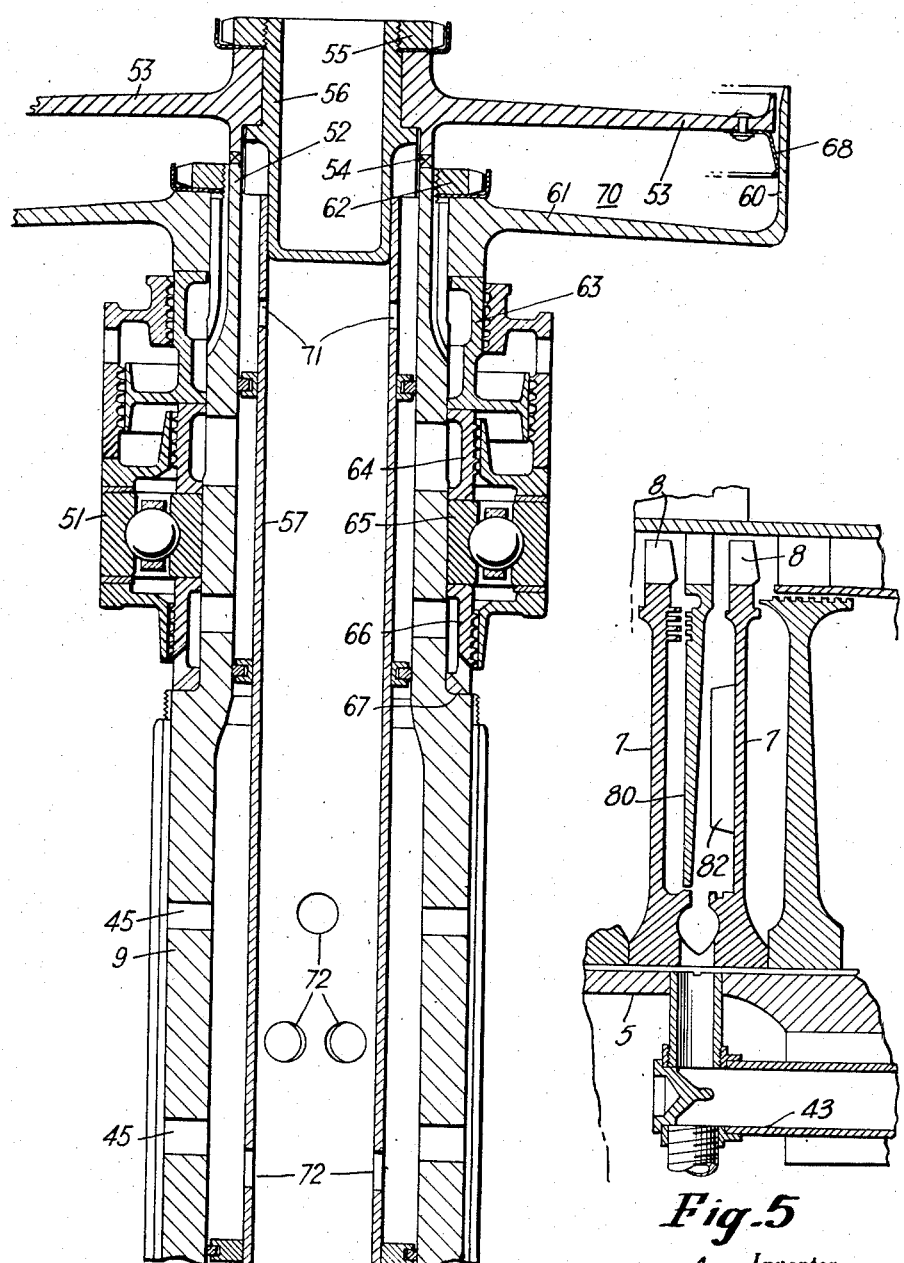

United States Patent Office 2,852,917
Patented Sept. 23, 1958

2,852,917

THRUST BALANCED COMBUSTION TURBINE ENGINES

Michael J. French, New Malden, England, assignor to D. Napier & Son Limited, London, England, a British company Application April 18, 1955, Serial No. 502,133

Claims priority, application Great Britain April 26, 1954

8 Claims. (Cl. 60—39.75)

This invention relates to combustion turbines of the kind comprising a rotary axial flow air compressor arranged to deliver air to one or more combustion chambers from which the products of combustion are delivered to an axial flow turbine, the rotor of which is coaxial with that of the compressor and drives it through a direct rotary transmission assembly.

An object of the invention is to provide such a combustion turbine having improved means for dealing with the axial loads which are imposed on the rotors of the compressor and turbine by reason of the reaction between them and the gaseous working fluids, that is to say the air and the products of combustion.

In a combustion turbine of the kind referred to according to the present invention, the rotary transmission assembly by which the rotors of the compressor and turbine are connected includes concentric rotary members connected respectively to the two rotors so as to be held respectively from axial movement relatively thereto and carrying parts which together form at least one piston and cylinder assembly enclosing a chamber (hereinafter called a pressure chamber) which is arranged to receive air under pressure from an appropriate point in the compressor, the arrangement being such that the air pressure acts on the parts constituting the piston and cylinder assembly in opposite axial directions such as to apply the rotors axial forces tending to counterbalance the axial loads on the rotors due to the reaction between them and the working fluids.

In one arrangement according to the invention one of the two concentric rotary members carries a series of spaced piston parts while the other of the two concentric rotary members carries parts which form with the piston parts a series of piston and cylinder assemblies the chambers of each of which are subject to air pressure derived from the compressor and so arranged that the axial forces exerted on the rotors by the air pressure is the sum of the forces exerted on the parts constituting the piston and cylinder assemblies, thus permitting the overall diameter of the piston and cylinder assemblies for a given pressure of air to be small in relation to the total counterbalancing axial forces exerted on the two rotors thereby.

The piston and cylinder assembly or assemblies may be arranged between the turbine and compressor rotors. Alternatively the piston and cylinder assembly may be arranged on the common axis of the compressor and turbine, but outside the rotors. Thus in one preferred construction the assembly lies at a point on the side of the turbine remote from the compressor and where, therefore, the overall diameter of the piston and cylinder assembly is not restricted by a surrounding combustion chamber or series of combustion chambers. In a modification of such an arrangement the parts of the two concentric rotary members which carry the piston and cylinder parts might lie on the side of the compressor rotor remote from the turbine where, again, the overall diameter of the piston and cylinder assembly would be unrestricted by the presence of a surrounding combustion chamber or series of combustion chambers.

In any case means are preferably provided for transmitting torque between the two rotors, independently of the piston and cylinder assemblies, by means of a coupling which permits at least limited axial movement therebetween. Thus one of the two concentric rotary members conveniently the outer of these parts, is preferably arranged to transmit the required torque between the rotors of the compressor and turbine and is thus connected to one of these rotors in a manner preventing both relative rotation and relative axial movement and to the other in a manner preventing relative rotation but permitting free relative axial movement, as by means of a spline type coupling.

Figure 2:
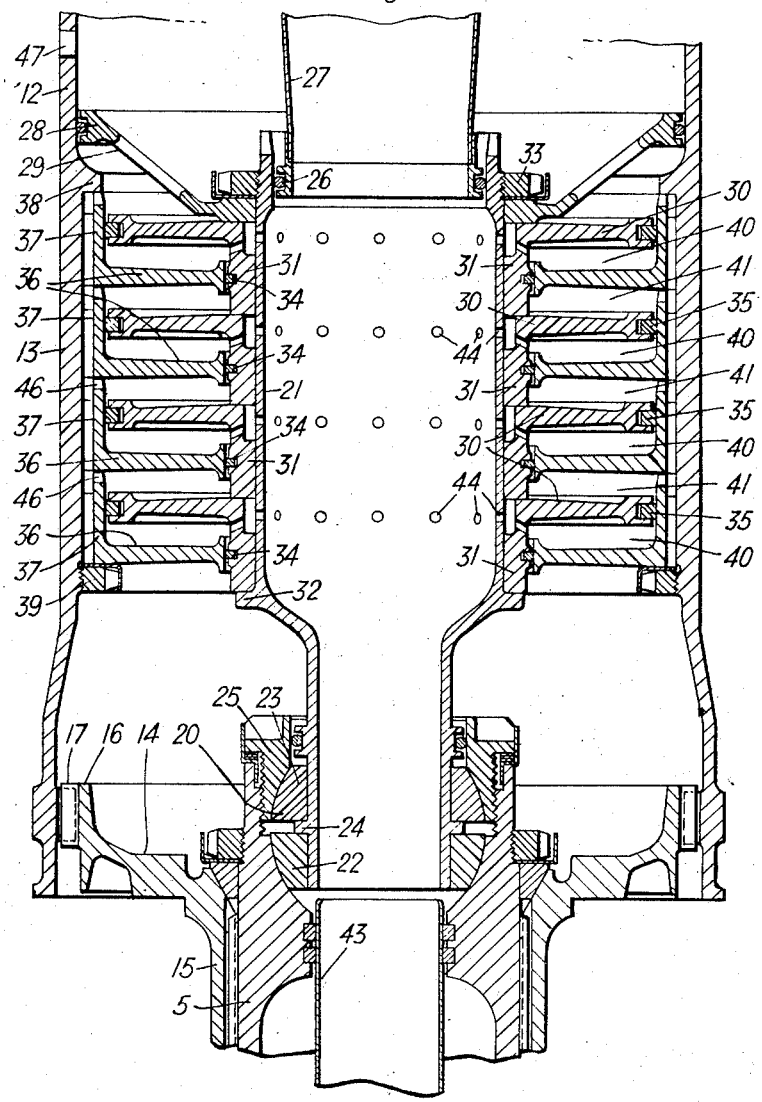
Figure 3:
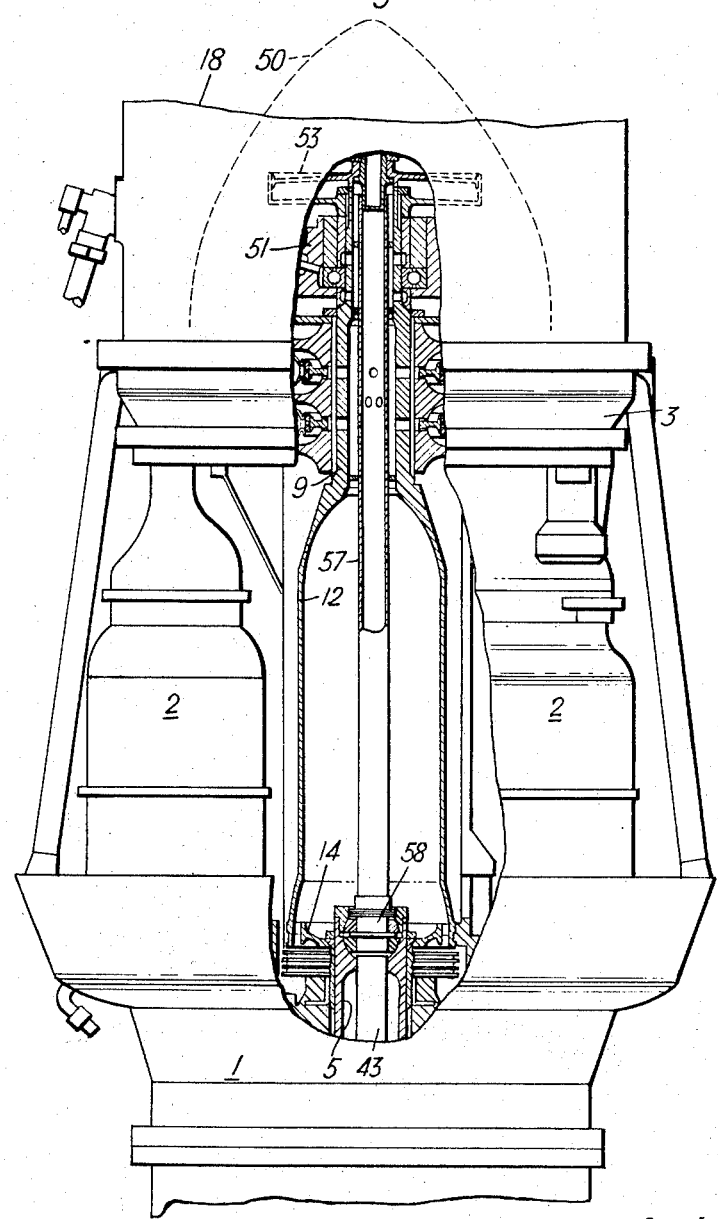

The invention may be performed in various different ways but two specific embodiments will now be described by way of example, with reference to the accompanying drawings, in which:

Figure 1 is a fragmentary side elevation, partly in section, of a combustion turbine aircraft power plant, with thrust balancing equipment arranged between the compressor and turbine, Figure 2 is a sectional side elevation on an enlarged scale of the thrust balancing apparatus included in Figure 1, Figures 3 and 4 are views corresponding respectively to Figures 1 and 2, of a modified combustion turbine power plant in which the thrust balancing equipment is arranged at the rear end of the turbine, and Fig. 5 is an enlarged fragmentary sectional view of the structure shown in the left hand end of Fig. 1.

Referring first to Figures 1 and 2, the power plant comprises a multi-stage compressor 1 of the axial flow type arranged to deliver air to the front and of a series of combustion chambers 2 the rear ends of which are connected to the casing of a turbine 3. The products of combustion after passing between the turbine blades 4, are led into an exhaust duct 18. From which they issue as a propulsive jet. The turbine and compressor are arranged in the usual manner with the axes of their rotors coaxial.

The rotor of the compressor comprises a hollow shaft 5 supported at each of its ends on bearings 6 (only the rear bearing being illustrated) carried by the compressor casing, and including the usual rotor discs 7 on which are mounted rotary blade rings 8. The rotor of the turbine 4 comprises a hollow shaft 9 supported at its rear end, which is of relatively small diameter, in a bearing 10 from the casing of the turbine and carrying on a part of somewhat larger diameter in front of such bearing or bearings three discs 11 carrying the usual rotary blade rings 4. The forward end of the turbine rotor shaft 9 merges into a drum-like part 12 of considerably larger diameter. The front end of this drum-like part 12 is connected rigidly to a cylindrical extension 13 (hereinafter called for convenience the rotary cylinder) the front end of which is connected to and supported upon the rear end of the shaft 5 of the compressor rotor through a splined coupling member 14 the inner part 15 of which is splined to the rear end of the compressor shaft 5 while the outer part 16 is provided with external radial teeth or splines 17 engaging internal radial teeth on the interior of the front end of the rotary cylinder 13. The arrangement is thus such that the rotary cylinder 13 transmits rotation directly from the turbine rotor 9 to the compressor rotor 5 while, however, free limited relative axial movement is permitted between the rotary cylinder 13 and the compressor rotor 5 by reason of the splined connection referred to.

Connected to the rear end of the compressor shaft 5 by means of a ball-and-socket type connection 20 is the front end of an inner tubular member 21 lying within and spaced by a substantial radial distance from the inner wall of the rotary cylinder 13.

The connection 20 includes two part spherical elements 22, 23, carried by the member 21, and located axially by a flange 24, while the compressor shaft 5 is formed with a cooperating internal part-spherical recess which is closed by a locating ring 25. The connection is therefore capable of transmitting axial thrusts in both directions between the compressor shaft 5 and the member 21, while permitting small relative deflection between the axes of these two members.

The rear end of the inner tubular member 21 is connected by means of a sealing member 26, forming part of a sliding joint, to a thin section tubular member 27 arranged coaxial within the drum-like part 12 and secured at its rear end to the turbine rotor shaft 9. The rear end of the tubular member 21 is also supported centrally within the cylinder 13 by means of an annular supporting ring 28, formed with spaced apertures 29 and making a sliding fit with the inner surface of the drum-like part 12. Rigidly mounted upon the inner tubular member 21 is a series of spaced annular discs 30 constituting piston parts each of which has an approximately cylindrical boss 31 projecting in one axial direction from its inner edge so as to constitute a distance piece which spaces it from its adjacent disc. The discs 30 are located axially between an abutment 32 formed upon the inner tubular member 21 at one end, and a clamping ring 33 at the other end. A groove carrying a resilient sealing ring 34 is formed in the outer circumferential surface of each of these bosses 31, while a groove carrying a resilient sealing ring 35 is also formed in the outer circumferential edge of each disc 30.

Rigidly secured within the rotary cylinder 13 is a series of spaced annular discs 36 each having a tubular extension 37 extending axially in one direction from its outer edge, each of these tubular extensions having a cylindrical internal surface with which engages one of the sealing rings 35 in the outer circumferential edge of one of the spaced discs 30 on the inner tubular member 21 while the inner circumferential edge of each of the spaced discs 36 carried by the rotary cylinder 13 has a cylindrical surface which is engaged by one of the sealing rings 34 arranged in the grooves in the bosses 31 of the spaced discs 30. The discs 36 are located axially between an internal annular abutment 38 on the rotary cylinder 13, and a locking ring 39.

The spaced discs 30, 36 carried respectively by the inner tubular member 21 and the rotary cylinder 13 thus together form piston and cylinder assemblies enclosing between them annular chambers which are substantially sealed by the sealing rings 34, 35 referred to.

Only the appropriate alternate chambers 40 constitute pressure chambers, namely those chambers which lie on the side of each of the discs 30 which is adjacent to the compressor, and therefore on the side of each of the discs 36 which is adjacent the turbine. The pressure chambers 40 are connected to a source of air pressure, while the other alternate chambers 41 are maintained in constant communication with a low pressure space.

For this purpose and as shown in Fig. 5 a part of the highly compressed air from the outlet of the compressor 1 is led radially inwards through a passage 42 between adjacent rotor and stator discs 7 and 80 respectively of the compressor, into a central conduit 43 lying within the compressor shaft 5. One of the rotor discs 7 may support a spiral blade 82 for impelling the air radially inwardly toward the conduit 43. The conduit 43 communicates with the forward end of the tubular member 21, and the member 21 is formed with a series of rings of apertures 44, through which the pressurized air can pass into the pressure chambers 40. The interior of the tubular member 21 also communicates with the tubular member 27 and hence with the interior of the turbine shaft 9, and the turbine shaft 9 is provided with a number of drillings 45 through which the compressed air passes in order to cool the turbine rotor discs 11. The escape of air through the drillings 45 is however restricted, and the pressure within the tubular member 21, and therefore also within the pressure chambers, is thus maintained at a suitable relatively high value.

The low pressure chambers 41 on the other hand are vented to a low pressure region, by way of ports 46 at the outer periphery thereof, and escape ports 47 in the drum-like member 12, which communicate with a low pressure region not forming part of the combustion system of the power plant.

It will thus be seen that the relatively high air pressure in the pressure chambers 40 acting on the disc 30 and 36 will tend to draw the compressor shaft 5 and the turbine shaft 9 towards one another, thus counteracting partially or wholly the axial forces exerted on the compressor and turbine rotors in directions away from one another, by reason of the reaction between their blades and the working fluid. It will be understood that by this arrangement both the rear end of the compressor shaft 5, and the whole of the drum-like member 12 are in tension.

In the modification illustrated in Figures 3 and 4, the compressor, combustion chambers and turbine are identical with the parts described above with reference to Figures 1 and 2, and the turbine shaft 9 is connected for rotation with the compressor shaft through the drum-like part 12, which is connected to the compressor shaft by means of the splined coupling member 14. For convenience these identical parts are indicated by the same reference characters.

In the present modification the relative outward axial thrusts on the compressor and turbine are resisted by a balance piston assembly arranged on the side of the turbine remote from the compressor, and within the normal free space enclosed by a conical wall member 50 within the exhaust duct 18. For this purpose the rear end of the turbine shaft 9, which is supported externally in a bearing assembly 51, is provided with an extension part 52 which is connected for rotation with a radial flange member 53 by means of a dog-type coupling 54. The flange member 53 is secured by means of a lock nut 55 to an end plug 56 which is secured as by welding to a hollow tension member 57 which extends through the center of the turbine shaft 9 and the drum-like member 12 and is connected at its forward end to the compressor shaft 5 by means of a ball-and-socket thrust coupling 58 corresponding to the coupling 20 in Figures 1 and 2. Any axial thrust on the flange member 53 is thus transmitted through the hollow tension member 57 to the compressor shaft.

The periphery of the flange member 53 lies within an open-ended cylindrical drum 60 formed integral with a second flange member 61 which is located axially on the turbine shaft 9 by means of a lock nut 62. This lock nut holds the flange member 61 closely in position against a series of members 63, 64, 65, 66, which form part of the bearing assembly 51, and which all rotate with the turbine shaft 9, and abut against a shoulder 67 formed on this shaft. It will be seen therefore that any axial thrust exerted on the second flange member 61 is transmitted directly to the turbine shaft 9. It will be understood moreover that the flange member 61 will rotate with the turbine shaft, and will therefore also rotate in synchronism with the first flange member 53.

An annular flexible sealing ring 68 is secured to the periphery of the first flange member 53, and contacts the interior surface of the drum 60, to make a fluid tight seal therewith, while yet permitting slight relative movement between these parts in an axial direction. The sealing ring 68 may be of a resilient nature, but in any case it will be urged outwards into contact with the surface of the drum 60 under the action of centrifugal force due to the rotation of the flange member 53.

The annular chamber 70 enclosed between the flange member 53 and the combined drum and flange member 60, 61, communicates with the interior of the hollow tension member 57 through ports provided between the dog-type coupling 54, and further ports 71 formed in the wall of the tension member itself. The rear end of the hollow member is closed by the end plug 56, as described above, and the front end communicates with the conduit 43 within the compressor shaft 5, which, in the same manner as described with reference to Figures 1 and 2, is supplied with air at relatively high pressure from the main outlet of the compressor 1. The part of the hollow member 57 which lies within the turbine shaft 9 is provided with ports 72 by which some of the pressurized air within this member is led to the turbine rotor discs 11 for cooling purposes, but the flow of air through these ports is restricted, and the pressure within the chamber 70 is therefore maintained at a relatively high value.

It will be understood that the resultant axial thrust on the members 53 and 61 due to the pressure within the chamber 70 will exert a tensile force on the member 57, and a compressive force on the turbine shaft 9, tending to urge the turbine and compressor rotors towards one another, and so to resist the dynamic axial thrust on these rotors in an outward direction caused by the reaction of the working gas passing through the power plant.

In the example illustrated in Figures 3 and 4, the air balance piston assembly is arranged at one end of the turbine compressor assembly and it is therefore possible to increase the diameter and effective cross sectional area of the piston element in order to increase the potential balancing thrust without unnecessary duplication of parts.

The value of the air pressure within the chamber 70 in Figures 3 and 4, or in chambers 40 in Figures 1 and 2, will vary with the output pressure of the compressor, and since the compressor output pressure varies in a similar manner with the axial dynamic thrust on the compressor caused by the flow of air therethrough, the balancing thrust exerted by the air balance piston assembly in each case may be made to correspond to the required counterbalancing thrust.

It will be apparent that with the present invention the parts of the piston and cylinder assemblies subject to air pressure rotate as a unit so that the sealing means used therein do not have to allow for relative rotational movement between the piston and cylinder parts but only for the small amount of axial movement which thermal expansion and contraction and/or changes in the air pressure acting thereon may require.

What I claim as my invention and desire to secure by Letters Patent is:

1. A combustion turbine comprising an axial flow air compressor, at least one combustion chamber, and a coaxially arranged axial flow turbine, the flow through the compressor being in the same axial direction as the flow through the turbine, a rotary transmission assembly extending between and coaxially with the rotors of the compressor and turbine by which the turbine rotor drives the air compressor, the said rotary assembly including concentric rotary members connected respectively to the two rotors by means capable of transmitting axial loads between each rotary member and the associated rotor, such members carrying parts which together form respectively at least one piston and cylinder assembly enclosing a chamber, and means for delivering air under pressure to said chamber from an appropriate point in the compressor, the arrangement being such that the air pressure acts on the parts constituting the piston and cylinder assembly in opposite axial directions such as to apply to the compressor and turbine rotors axial forces tending to counterbalance the axial loads on the two rotors due to the reaction between them and the working fluids.

2. A combustion turbine as claimed in claim 1, in which one of the two concentric members carries a series of axially spaced piston parts while the other of the two concentric members carries parts which form with the piston parts a series of piston and cylinder assemblies, the chambers of each of which are subject to air pressure derived from the compressor, and so arranged that the axial forces exerted on the rotors by the air pressure is the sum of the forces exerted on the parts constituting the piston and cylinder assemblies, thus permitting the overall diameter of the piston and cylinder assemblies, for a given air pressure, to be small in relation to the total counterbalancing axial forces exerted on the two rotors thereby.

3. A combustion turbine as claimed in claim 2, in which the piston and cylinder assemblies are arranged between the compressor and turbine rotors.

4. A combustion turbine as claimed in claim 1 in which the piston and cylinder assembly is arranged on the common axis of the compressor and turbine rotors, but outside the rotors.

5. A combustion turbine as claimed in claim 4, in which the piston and cylinder assembly is arranged on the side of the turbine rotor remote from the compressor.

6. A combustion turbine as claimed in claim 1, in which the air pressure is delivered to the piston and cylinder assembly or assemblies through a radial conduit associated with the compressor, and a tubular conduit arranged coaxially with the compressor and turbine rotors.

7. A combustion turbine as claimed in claim 1, including coupling means for transmitting torque between the compressor and turbine rotors, independently of the piston and cylinder assemblies, the said coupling means being arranged to permit at least limited axial movement between the two rotors.

8. A combustion turbine as claimed in claim 1 in which the compressor and turbine each comprise a stator casing, and including thrust bearings mounted on said casings and supporting said compressor and turbine rotors, to locate said rotors individually in an axial direction with respect to the casings.

References Cited in the file of this patent
UNITED STATES PATENTS

| | | |
|---|---|---|
| 2,429,681 | Griffith | Oct. 28, 1947 |
| 2,711,074 | Howard | June 21, 1955 |
| 2,718,350 | Burgess | Sept. 20, 1955 |

OTHER REFERENCES

"The Armstrong Siddeley Python," 1 plate drawing, reprinted from The Aeroplane, August 26, 1949.